United States Patent [19]

Eaton

[11] Patent Number: 4,505,262

[45] Date of Patent: Mar. 19, 1985

[54] PASSIVE SOLAR HEATED SYSTEM

[76] Inventor: Douglas W. Eaton, P.O. Box 605, Irvine, Ky. 40336

[21] Appl. No.: 531,153

[22] Filed: Sep. 9, 1983

[51] Int. Cl.³ .................................................. F24J 3/02
[52] U.S. Cl. .................................... 126/435; 126/437; 126/418; 126/434
[58] Field of Search ............... 126/422, 435, 437, 433, 126/434, 419, 364, 418; 122/20 B; 285/132, 133, 138 R, 177, 162, 196, 338

[56] References Cited

U.S. PATENT DOCUMENTS

| | | | |
|---|---|---|---|
| 1,250,260 | 12/1917 | Wilcox | 126/435 |
| 1,425,174 | 8/1922 | Cartter et al. | 126/435 |
| 4,044,948 | 8/1977 | Bottum et al. | 126/435 |
| 4,050,508 | 9/1977 | Buckley | 126/434 |
| 4,157,706 | 6/1979 | Gaskill | 126/435 |
| 4,235,325 | 11/1980 | Miller | 122/20 B |
| 4,413,615 | 11/1983 | Sigworth, Jr. | 126/435 |

FOREIGN PATENT DOCUMENTS 2640135  3/1978  Fed. Rep. of Germany ...... 126/434

OTHER PUBLICATIONS

Hot Water-Day and Night, p. 135, Solar Age, Aug., 1981, Todd H. Brown, pp. 20-21.

Primary Examiner—James C. Yeung
Attorney, Agent, or Firm—King, Liles & Schickli

[57] ABSTRACT

A passive solar water heater includes a heat exchanger having concentric pipes for providing heat transfer by convective, counterflow action. The inner pipe includes reducer elements at each end. The reduced pipe extends through resilient annular grommets in the caps closing the ends of the outer pipe. The resilient grommets provide watertight seals with the weight of the heat exchanger providing the pressure necessary for maintaining the seal of the lower grommet. An air space is also provided in the outer pipe for the expansion and contraction of the working fluid. A check valve between the solar collector and heat exchanger prevents the reverse flow of working fluid. A resilient, heat conductive S-insert is provided in the inner concentric pipe to increase the heat exchange surface area and improve performance. The insert is removable for ease of cleaning. Finally, a high temperature limit bypass protects the solar collector from damage caused by excessively high temperatures of the working fluid.

10 Claims, 6 Drawing Figures

Fig. 1

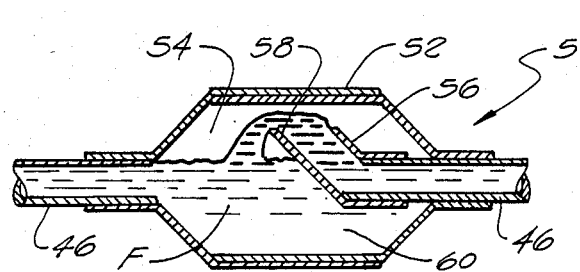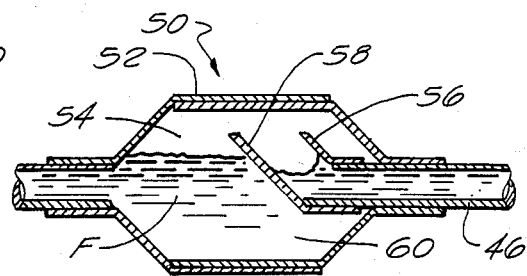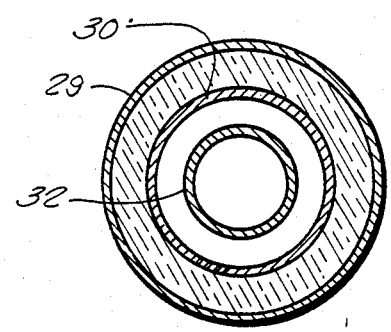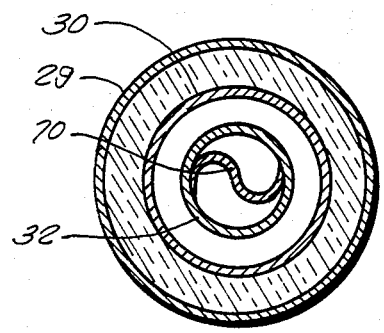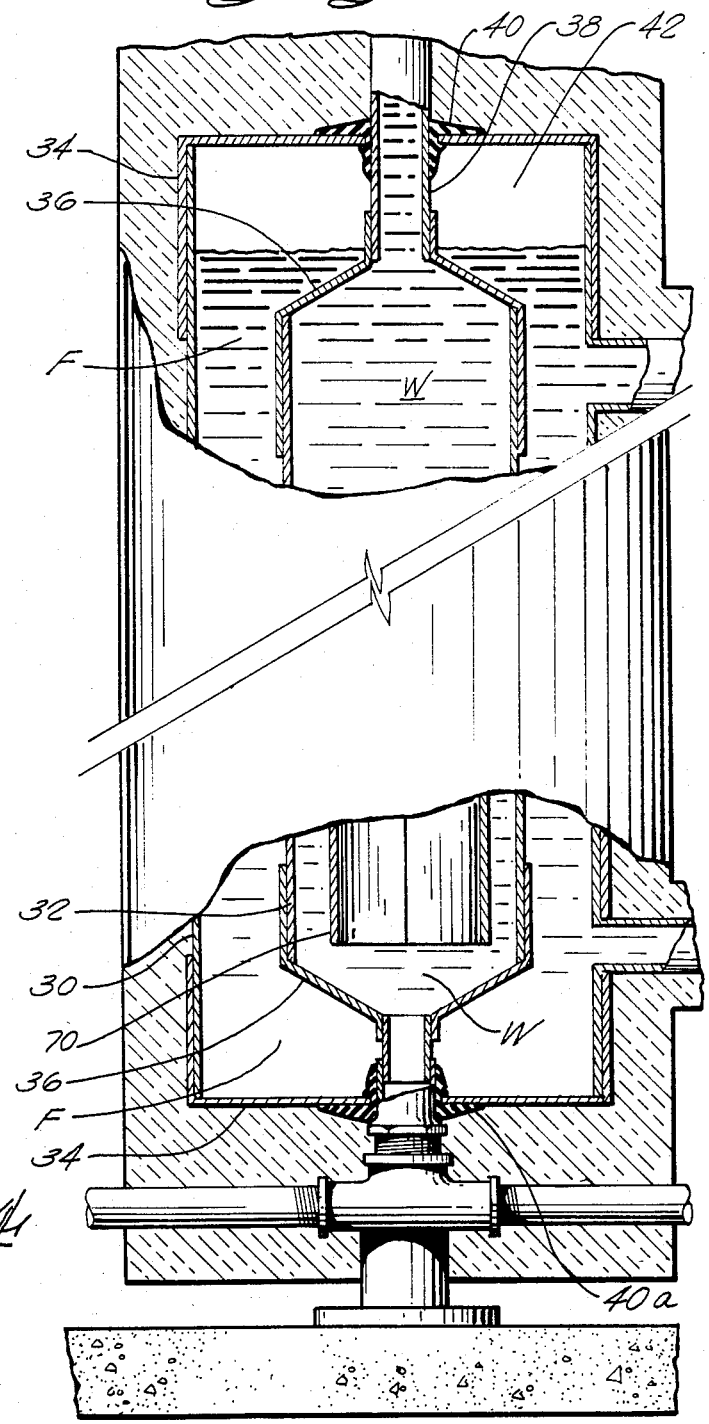

PASSIVE SOLAR HEATED SYSTEM

TECHNICAL FIELD

The present invention relates generally to the solar energy field and, more particularly, to a simple and efficient passive solar water heating system wherein concentric pipes provide heat transfer from a working fluid to the water by convective, counterflow action.

BACKGROUND ART

Solar heating systems have been around since nearly the turn of the century. Early systems, such as those shown in U.S. Pat. Nos. 1,250,260 to Wilcox and 1,425,174 to Cartter et al., however, suffered a general lack of sturctural integrity and lack of efficiency. With the price of fossil fuels very low, solar systems of this era were commercially unsuccessful.

At present, the solar water heaters for both residential and commercial uses are becoming more and more popular. This is primarily due to two trends in recent years. First, the costs of electricity and natural gas have increased dramatically and are continuing to escalate. Second, the integrity and energy efficiency of solar water heaters is rising due to improved engineering of the systems and components. Together, these trends make solar water heaters cost competitive in an expanding geographical area.

Solar water heating systems may be broken down into two general types; active and passive systems. Active systems are generally more expensive and include pumps and elaborate electronic controls to circulate the water and working fluid through the various components. Conversely, passive systems rely on the laws of nature, such as the laws of thermodynamics and gravity to provide circulation. The greatest appeal of passive systems, such as the present invention, lies in their simplicity and attendant ease of installation and low maintenance costs. These assets translate directly into low initial cost, reliability, low maintenance, and high performance.

Passive systems, however, are not without their disadvantages. They are, in fact, at a distinct disadvantage in northern climates where freeze protection is critical. Thus, if the fluid is not heated sufficiently by the solar collector, it may become stagnant and freeze resulting in loss of the heating function and possible damage to the system.

In extremely hot weather and/or in times of little or no hot water use, stagnation is again a problem with temperatures of the working fluid approaching those of a solar oven. At such high extremes of temperature, the solar collector glazing may yellow, and the working fluid may turn acidic and corrosive, and in some extreme instances, steam is formed causing a vapor lock and/or an explosion.

Therefore, in order to extend the free use of passive solar heating systems globally, there is a need to improve their function by simple, efficient means.

DISCLOSURE OF THE INVENTION

Accordingly, it is the primary object of the present invention to provide a low cost solar heating system of simple structure and easy installation.

Another object of the invention is to provide a solar heating system of improved durability requiring minimal maintenance.

Still another object of the present invention is to provide a solar heating system having simple and efficient means for improved heating function that is capable of withstanding the stresses of temperature extremes.

A further object of the invention is to provide a check against the tendency of the system to reverse its intended course of operation during times of no solar radiation.

An additional object of the present invention is to provide a solar heating system wherein heat is more efficiently transferred from the working fluid to the water by convective, counterflow action.

A further object of the present invention is to provide a solar heating system wherein passive flow of the working fluid is prevented unless the thermal energy of the fluid is increased sufficiently as it passes through the solar collector.

Another object of the present invention is to provide a solar heating system protected from the damage that may be caused by excessively high working fluid temperatures.

Additional objects, advantages, and other novel features of the invention will be set forth in part in the description that follows and in part will become apparent to those skilled in the art upon examination of the following, or may be learned with the practice of the invention. The objects and advantages of the invention may be realized and attained by means of the instrumentalities and combinations particularly pointed in the appended claims.

To achieve the foregoing and other objects, and in accordance with the purposes of the present invention as described herein, an improved solar heating system is provided for heating water with increased efficiency using a solar collector, storage tank, and heat exchanger. Means utilizing thermosiphon principles are provided for circulating the working fluid, such as polyglycol and water mixture, between the solar collector, where its thermal energy is increased, and the heat exchanger. Further thermosiphon means provides for transferring water from the storage tank to the heat exchanger and back again.

The heat exchanger is formed from first and second pipes in substantially concentric relation for improved efficiency in transferring heat radially by convection from the working fluid to the water. Reducer elements are provided on each end of the inner concentric pipe adjacent end caps enclosing the outer concentric pipe. The reduced portion of the inner pipe extends through sealing means in the end caps. Preferably, these sealing means are resilient, annular grommets and the weight of the heat exchanger itself serves to maintain the watertight seal of the lower grommet. This simplified structure serves to increase efficiency and greatly reduce manufacturing costs.

The outer pipe of the heat exchanger includes an air space allowing for the expansion and contraction of the working fluid as it is first heated in the solar collector and then cooled by conduction through the inner pipe wall as it heats the water. The upper grommet between the concentric pipes seals the upper portion of the heat exchanger. A captive air space is formed within the outer pipe and maintained irrespective of the expanded or contracted condition of the working fluid. Therefore, the flow of the working fluid is not subject to or altered by the hydraulic pressure fluctuations caused by the expansion or contraction of the working fluid in the closed system. Additionally, the need for a separate expansion tank is alleviated and the expenses involved with its installation avoided.

The solar heating system may further include a check valve to prevent the reverse flow of the working fluid. The valve has a unique design to allow positive flow only when sufficient thermal energy is present for convective heating of the water. Specifically, the valve includes an upwardly extending pipe carrying working fluid from the solar collector toward the heat exchanger opening into a hollow, captive air bulb. If sufficient thermal energy is present in the working fluid, it climbs up the pipe and flows out over the mouth through the bulb and on toward the heat exchanger. If the necessary thermal energy is not present, the working fluid does not rise up the pipe sufficiently to reach the mouth and flow ceases.

Reverse flow of working fluid to the solar collector is prevented as trapped air in the bulb or valve chamber prevents the fluid on the heat exchanger side from rising sufficiently to enter the mouth of the upwardly extending pipe. Such a check valve is of compact configuration and is virtually maintenance free since there are no moving parts. It serves to provide improved solar heating efficiency at a low cost by insuring regulated, proper direction flow under all conditions.

Preferably, the solar heating system includes an insert of high thermal conductivity within the inner concentric pipe of the heat exchanger. Such an insert is preferably positioned in the lower portion of the pipe to increase the heat transfer surface area of the exchanger and thus provide an improved heating function. The insert may be of S-shape and slightly larger than the pipe and resilient. The insert is compressed, inserted in the pipe and released so as to contact the inner surface of the pipe and be held in position by friction, thus providing improved conduction with the surrounding heated working fluid. Additionally, the insert may be removable so that it and the pipes may easily be cleaned during any maintenance.

It is further provided that the solar heating system include a high temperature limit bypass circuit. This bypass circuit serves to divert the working fluid from the solar collector/heat exchanger circuit when the temperature of the fluid becomes excessively high and threatens to damage the system. For example, the excessively high temperatures could cause yellowing of the collector glazing, outgassing of the insulation, and/or the working fluid itself to turn acidic and corrosive or even turn to steam and explode the system. Preferably, the bypass includes a thermostatic (thermal diode) valve which upon opening, directs the excessively heated fluid through a heat dissipator pipe having a series of fins. Upon sufficient cooling of the working fluid, the valve closes and the working fluid again circulates through the regular solar collector/heat exchanger circuit.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description, serves to explain the principles of the invention. In the drawing:

FIG. 1 is a partially broken away side elevational view showing the solar heating system of the present invention;

FIG. 2 is a cross-sectional view of the check valve of the present invention showing the positive, passive flow of working fluid through the upwardly extending portion of the pipe, over the mouth, and on toward the heat exchanger;

FIG. 2A is a cross-sectional view of the check valve of the present invention showing the cessation of working fluid passive flow and further showing the trapped air within the chamber preventing the back flow of fluid from the heat exchanger to the collector;

FIG. 3 is a cross-sectional view of the heat exchanger of the present invention along line 3—3 of FIG. 1;

FIG. 3A is a cross-sectional view of the heat exchanger of the present invention along line 3A—3A of FIG. 1; and FIG. 4 is an enlarged, partial cross-sectional view showing further the concentric relation of the pipes of the heat exchanger and the resilient S-shaped insert within the lower portion of the inner pipe.

Reference will now be made in detail to the present preferred embodiment of the invention, an example of which is illustrated in the accompanying drawing.

BEST MODE OF CARRYING OUT THE INVENTION

Figure 1:
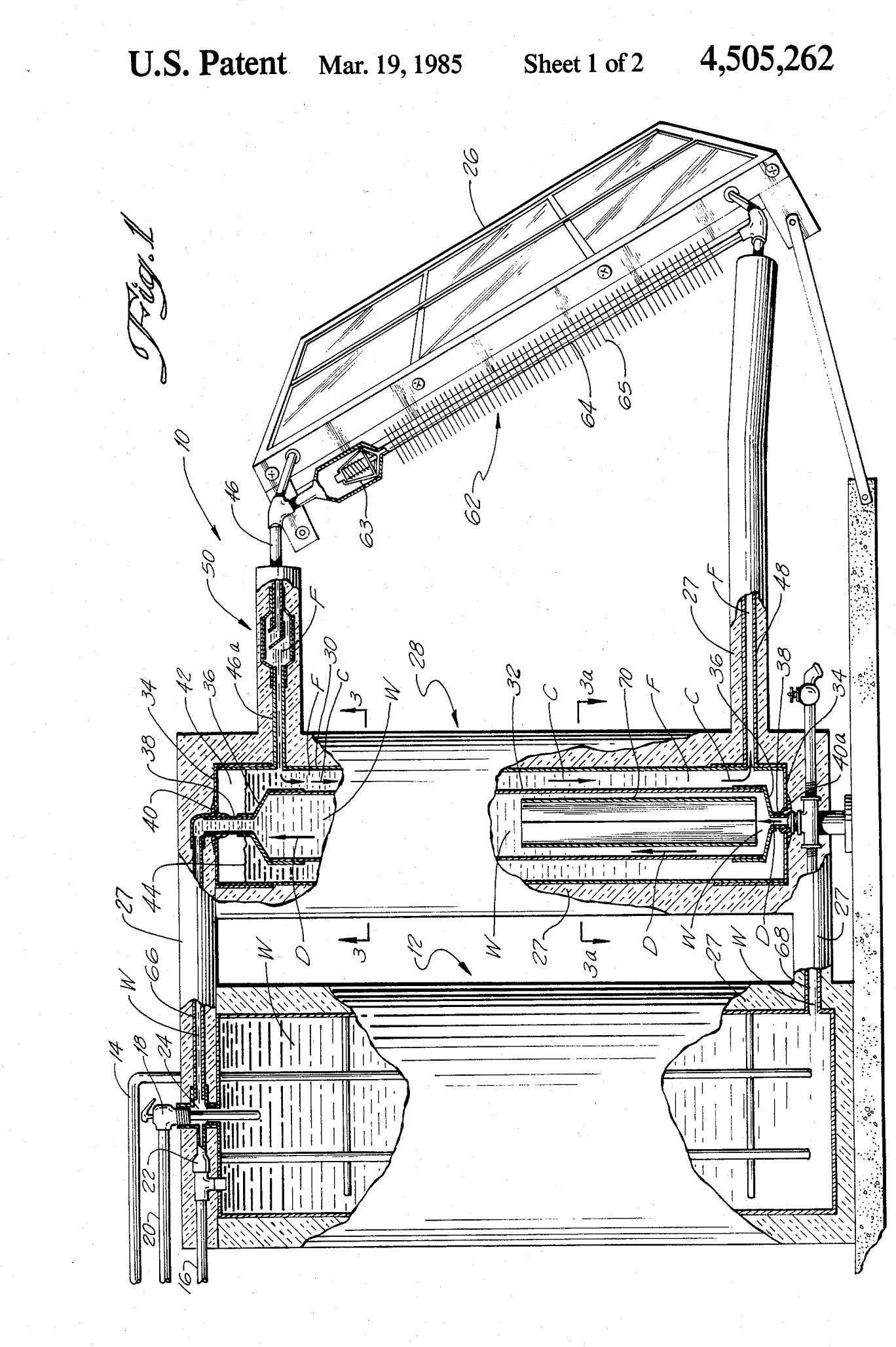

Reference is now made to FIG. 1 showing the improved solar heating system 10 of the present invention for transferring thermal energy from heated working fluid F to water, W, by convective, counterflow action. The system includes a storage tank 12, such as a standard electric water heater. Cold water is conveyed to the tank 12 by means of inlet line 14. Hot water for bathing or the like is drawn from the tank 12 via line 16. The tank 12 also includes a pressure and temperature safety valve 18 that prevents the tank from exploding upon the buildup of excessive steam pressure. When open, the water and steam passes through the valve 18 down pipe 20 to a drain (not shown).

As shown, the tank 12 also includes an air bleeder 22. The air bleeder 22 connects the high point 24 on the tank 12 with the hot water out line 16. When hot water is being used, hot water travelling from tank 12 along line 16 creates a suction that pulls trapped air through bleeder 22 from high point 24. The removal of the air from the system is necessary in order to insure free, unblocked flow.

The system of the present invention also includes a solar collector 26. As is known in the art, the collector 26 may consist of one or more panels for collecting thermal energy from the sun and transferring that energy to a circulating working fluid F. Additionally, insulation 27 is provided throughout the solar heating system 10 of the present invention in order to achieve maximum heating efficiency and reduce the loss of heat to the surrounding air. Of course, any known type of insulation may be used so long as it may be adapted to the particular use contemplated.

As may be appreciated from viewing FIG. 1, the solar heating system of the present invention further includes a heat exchanger 28. The heat exchanger 28 includes an outside skin 29, a first, outer pipe 30 and a second, inner pipe 32. (See also FIGS. 3 and 3A). The outer pipe 30 is sealed at each end by means of caps 34. The inner pipe 32 is closed at each end by the means of reducer elements 36. The reduced portions 38 of inner pipe 32 then extend through the end caps 34. It should be noted that the pipes 30, 32 are not in communication with each other and that they are, in fact, in substantially concentric spaced relation. This allows for the efficient radial transfer of heat by convective, counterflow action from the heated working fluid F to the water W.

Sealing between the end caps 34 and reduced pipe portions 38 is provided by means of resilient, annular grommets 40, 40a that fit snuggly around the reduced pipe portions. The watertight seal of the lower grommet 40a is maintained by the compressive force exerted by the weight of the heat exchanger 28. Therefore, the use of sealing compounds that may break down over time due to the presence of the heated working fluid F is avoided and cost-efficient, reliable, leak-proof performance is attained.

The upper grommet 40 maintains an air space or chamber 42 above the level of working fluid 44. The air space 42 allows for the expansion and contraction of the working fluid F within the system as it is heated by the solar collector 26 and cooled by conduction through inner pipe 32 with the water W therein. By maintaining a system with an integral expansion chamber, the expanded or contracted condition of the working fluid F is accommodated. The working fluid is maintained in a closed circuit and no pressure changes occur to effect working fluid flow. Further, this system alleviates the need for a separate expansion tank and thus, simplifies the solar heating system structure and reduces manufacturing costs.

As further shown, means for circulating the working fluid F by thermosiphonic action from the solar collector 26 to the heat exchanger 28 includes pipes 46, 46a, and 48. Heated working fluid F passes from solar collector 26 to the heat exchanger 28 along pipes 46 and 46a. As the working fluid F passes through outer pipe 30, it transfers thermal energy by conductance through inner pipe 32 to the water W therein. As the thermal energy is conducted away from the working fluid, it moves by convection (see arrows C) down the outer pipe 30 of the heat exchanger 28 to pipe 48. Pipe 48 circulates the working fluid back to solar collector 26 where the fluid is once again heated. As the working fluid is heated, it rises by convection in the solar collector 26 until it again circulates to the heat exchanger 28 through pipe 46. As should be appreciated, no pumps are required as this thermosiphon system relies on the laws of thermodynamics and gravity to provide circulation of the working fluid F. Therefore, the system is simple, inexpensive, easy to install, and maintenance free.

As shown, a check valve 50 connects pipes 46 and 46a. The check valve 50 prevents the flow of working fluid F unless sufficient thermal energy is present therein to promote passive but positive flow and heat the water W in exchanger 28. As shown in FIG. 2, the check valve 50 includes a bulb chamber 52 defining a trapped air space 54. Further, the pipe 46 includes an upwardly extending portion 56 terminating in a mouth 58. As shown, when sufficient thermal energy is present, the working fluid rises in upwardly extending portion 56 to spill over the lip of mouth 58 into the reservoir 60. From there, the working fluid F freely circulates by gravity along pipe 46a to the heat exchanger 28.

In FIG. 2A, the working fluid F does not have sufficient thermal energy to rise in upwardly extending portion 56 and spill over mouth 58. Such a situation may develop on cold, cloudy days when the solar collector 26 is unable to transfer sufficient thermal energy to the working fluid. It should be appreciated, however, that reverse or backward flow of the working fluid is prevented as the trapped, pressured air 54 in chamber 52 prevents the head of the reservoir 60 from moving the fluid F in the bulb back into the mouth 58. Therefore, any reverse circulation of the working fluid F is prevented and the heat within the water W of the heat exchanger is maintained.

The solar heating system may also include a high temperature limit bypass circuit 62. (See FIG. 1). In extremely hot weather, the bypass circuit 62 prevents the working fluid F from stagnating in the collector 26 and reaching temperatures approaching those of a solar oven. Such high extremes of temperature cause yellowing of the collector glazing, outgassing of the insulation, corroding of the system as the working fluid turns acidic, and even possible exploding. Therefore, if lowest maintenance and durability are to be assured, the bypass 62 is required.

As shown, bypass pipe 64 connects pipes 46 and 48. To control the flow, a thermostatic (thermal diode) valve 63 opens when the temperature of the working fluid reaches a certain preset value. When this happens, the fluid circulates through bypass pipe 64 to pipe 48 and back to the collector 26 (i.e., the heat exchanger 28 is bypassed). Cooling fins 65 are provided on pipe 64 to dissipate the heat to the ambient air and reduce the temperature of the working fluid. When the temperature of the working fluid F is reduced sufficiently, the valve 63 again closes and the fluid is once again circulated to the heat exchanger 28 for heating the water W.

Means are also provided for transferring water from the storage tank 12 to the heat exchanger 28 and back again. As shown in FIG. 1, the means include pipe 66 and 68. Pipe 66 transfers heated water from the heat exchanger 28 to the top of tank 12. Pipe 68 transfers cold water from the bottom of tank 12 to the second, inner pipe 32 of heat exchanger 28. There, the water W is heated by the hot working fluid F in outer pipe 30 by conduction through the inner pipe 32. As it is heated, the water W flows upward (see arrows D) in inner pipe 32 by convection until it leaves pipe 32 and is transferred back to tank 12 by pipe 66.

As shown in FIGS. 1, 3A, and 4, the lower portion of pipe 32 may include an insert 70 of material having a high thermal conductance. The insert 70 is provided to increase the heat transfer surface area and improve the efficiency of the solar heating system 10. As shown, the insert 70 is of S-shape and conducts by contact with the inner wall of pipe 32. Preferably, the insert is resilient and frictionally held within pipe 32. This simplifies installation and removal for ease of manufacturing, maintenance, and cleaning.

In summary, numerous benefits have been described resulting from employing the concepts of the invention. The heat exchanger 28 includes a first and second pipe 30, 32 respectively, in substantially concentric relation for the radial transfer of thermal energy from heated working fluid F to water W. Advantageously, the weight of the heat exchanger 28 maintains the watertight seal of the lower grommet 40A between the two pipes 30, 32. This simple structure ensures reliable, low cost and efficient manufacture of the present invention. The solar heating structure is further simplified by the presence of an air space 42 in the outer concentric pipe 30. This air space functions as an expansion tank and thus, reduces manufacturing costs by eliminating the need for that additional structure.

A check valve 50 is also provided to prevent reverse flow of the working fluid and to also regulate the positive flow of the working fluid from the collector 26. Additionally, the system includes a high temperature bypass circuit 62 that protects the components from the harmful effects associated with excessively high working fluid temperatures.

Finally, system efficiency is improved by the inclusion of high thermal conductivity insert 70 within pipe 32. The insert 70 provides additional heat transfer surface area. Since the insert 70 is frictionally received and held in pipe 32, simple installation and removal are provided for reduced manufacturing and maintenance costs.

The foregoing description of the preferred embodiment of the invention has been presented for the purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A solar heating system, comprising:
   a solar collector;
   a storage tank;
   a heat exchanger formed of first and second substantially straight-line pipes having respective pairs of end caps and reducer elements to close the ends;
   means for circulating working fluid through said solar collector and heat exchanger, said solar collector increasing the thermal energy of the working fluid, said means to circulate the heated working fluid causing the fluid to flow from said solar collector and enter said heat exchanger at the first end of said first pipe and exit at the second, opposite end of said first pipe before returning to said solar collector; and
   means for transferring water between said storage tank and said heat exchanger, said water flowing from said storage tank and entering said heat exchanger at the first end of said second pipe and exiting at the second, opposite end of said second pipe before returning to said storage tank;
   said first and second pipes of said heat exchanger being in substantially concentric relation so that heat is transferred radially by convection from the heated working fluid to the water;
   said reducer elements of said pipes being substantially concentric and positioned at each end adjacent to the end caps; and sealing means around the periphery of at least one pair of said reducer elements and a portion of the other pipe.

2. The solar heating system disclosed in claim 1, wherein said sealing means is provided in said end caps comprise resilient annular grommets receiving said reducer elements, and means for compressing said grommets to form watertight seals.

3. The solar heating system disclosed in claim 2, wherein said compressing means is provided by the weight of the heat exchanger maintaining the seal of said grommet at said second end of said first pipe.

4. The solar heating system disclosed in claim 1, wherein an air space is provided within said first pipe to allow for the expansion and contraction of said working fluid.

5. The solar heating system disclosed in claim 1, wherein a check valve is provided below the high point of the system and between said solar collector and said first end of said first pipe of said heat exchanger, said check valve serving to retain the thermal energy in said heat exchanger and said storage tank.

6. The solar heating system disclosed in claim 5, wherein said check valve includes a chamber forming an air space that prevents reverse flow of working fluid into said solar collector.

7. The solar heating system disclosed in claim 6, wherein said check valve further includes an entry pipe having an upwardly extending portion terminating in a mouth, the heated working fluid rising in said upwardly extending portion and spilling over said mouth so as to flow through said check valve to said heat exchanger.

8. The solar heating system disclosed in claim 1, wherein an insert of high thermal conductivity is provided within said second pipe adjacent to said first end in order to increase the heat transfer surface area of said heat exchanger.

9. The solar heating system disclosed in claim 8, wherein said insert is S-shaped and resilient to frictionally contact the inner surface of said second pipe.

10. The solar heating system disclosed in claim 9, wherein said resilient insert is removable to enable easy cleaning of said heat exchanger.

* * * * *